Feb. 13, 1968     C. H. SKINNER     3,368,664

CONVEYOR BELT WITH IMPROVED TROUGHING CHARACTERISTICS

Original Filed April 1, 1964

INVENTOR
Clayton H. Skinner

BY John L. Shortley

ATTORNEY

United States Patent Office 3,368,664
Patented Feb. 13, 1968

3,368,664
CONVEYOR BELT WITH IMPROVED TROUGHING CHARACTERISTICS
Clayton H. Skinner, Buffalo, N.Y., assignor, by mesne assignments, to Hewitt-Robins, Incorporated, Stamford, Conn., a corporation of Delaware
Continuation of application Ser. No. 356,571, Apr. 1, 1964. This application Oct. 4, 1966, Ser. No. 598,542
3 Claims. (Cl. 198—193)

This application is a continuation of my co-pending application. Ser. No. 356,571 filed Apr. 1, 1964, now abandoned.

The present invention relates to improvements in conveyor belts and more particularly pertains to a belt which is normally flat and the web thereof is in one general plane but is adapted to be flexed with lateral side edge portions hinged from the plane of the central portion to provide a trough as the belt is supported during its upper course of movement over supporting idler rolls.

A conventional conveyor belt is caused to assume a trough shape in service by means of supporting rolls so that the outer edge portions of the belt are hinged upwardly to form a trough for receiving and retaining granular material carried by the belt. The idler rolls comprise three rollers arranged at intervals under the upper course of movement of the belt. The axis of the central idler roll of each unit is customarily disposed in a horizontal position while the end idler rolls of each unit have their axes disposed upwardly at an angle with respect to the axis of the central idler roll. The angle between the axis of the central idler roll and the two outer idler rolls may amount to as much as forty-five degrees to provide a relatively deep trough shape when the conveyor belt is viewed in transverse section. There is a flexing of the belt in the area between an end of the central idler roll and the end of each outer idler roll. This flexing takes place throughout the length of the belt and is repeated as each lengthwise increment of the belt begins its upper course of movement over the supporting idler rolls. There are stresses developed in the structure of the belt along the hinge areas. The repeated flexing of the belt at the hinge areas provides failure at these zones while other portions of the belts remain in condition for further useful life. It has been found that conveyor belts may fail in the hinge areas in periods of several months.

An object of the present invention is to provide a conveyor belt which is adapted to be flexed into the form of a trough by the idler rolls of a conveyor with reinforcement in the hinge areas which overlie the gaps between each end of the central idler roll and a confronting end of an outer roll of each belt supporting unit without increasing the cost of the belt throughout its entire width.

A more specific object of the invention is to provide an increase in the number of longitudinally extending strands in the textile carcass of the belt with the added warp strands positioned within the hinge areas of the belt.

Other objects and features of the invention will be appreciated and become apparent to those skilled in the conveyor belt art as the present disclosure proceeds and upon consideration of the following detailed description taken in conjunction with the accompanying drawing wherein an embodiment of the invention is disclosed.

In the drawing:
FIG. 1 is a diagrammatic view of an idler roll assembly illustrating a belt exhibiting the invention in section and showing the manner in which it is caused to assume the shape of a trough by an idler roll unit.

Figure 1:
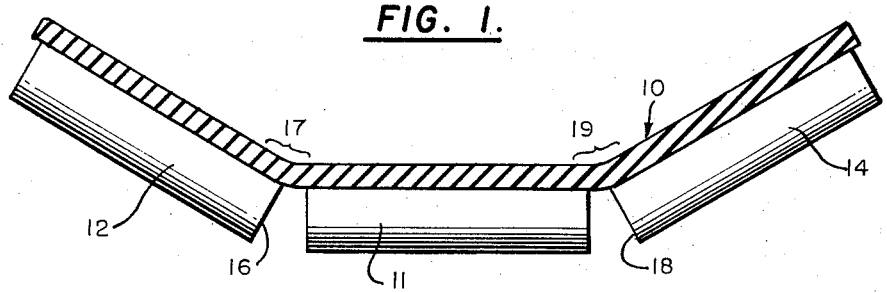
Figure 2:
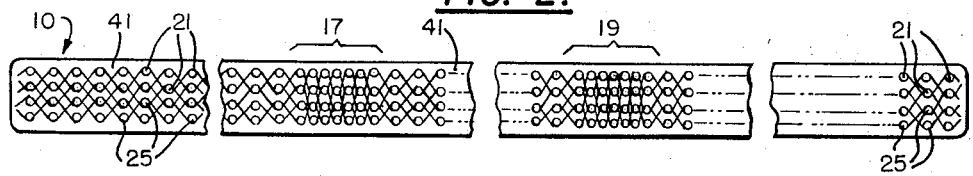
FIG. 2 is a transverse sectional view of the belt on a larger scale showing the warp strands in the hinge areas in relation to the longitudinally extending strands in other portions of the belt.
Figure 3:
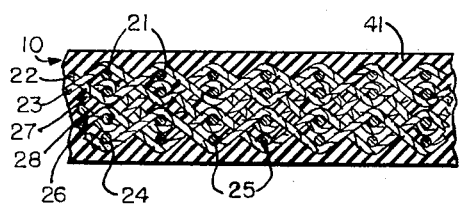
FIG. 3 is a fragmentary sectional view on a further enlarged scale showing a portion of the belt laterally of a hinge area.
Figure 4:
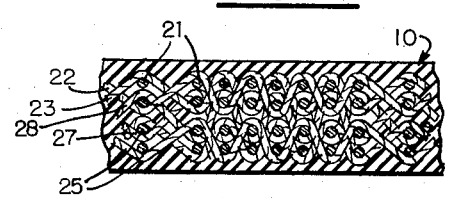
FIG. 4 is a view similar to FIG. 3 showing one of the hinge areas.

The invention is directed to a conveyor belt wherein textile strands are increased in number in the hinge areas only of the belt and such additional reinforcement may be added to any type of belt. In the embodiment illustrated in the drawing the added warp strands are illustrated in connection with a "solid woven" conveyor belt 10 adapted to be supported by idler roll units each of which consists of a central idler roll 11 and two end idler rolls 12 and 14. Such idler roll units support the belt 10 as illustrated in FIG. 1 throughout its upper course of movement to provide a trough shaped web structure supporting the granular material as it is conveyed from one point to another. The axis of the idler roll 12 and the axis of the idler roll 14 are each arranged at an acute angle with respect to the axis of rotation of the central idler roll 11. The inner end 16 of the idler roll 12 is necessarily spaced from the confronting end of the central idler roll 11 to provide a hinge area 17 in the belt 10. The inner end 18 of the end idler roll 14 is spaced from the confronting end of the central idler roll 11 to provide a hinge area 19 in the belt. These hinge areas extend throughout the length of the belt and are the elongated zones of a conventional belt which may fail while other portions of the belt remain in condition for further useful life.

Figure 5:
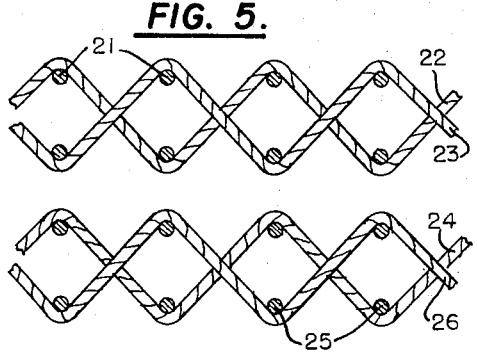
FIG. 5 is a diagrammatic view illustrating the manner in which one layer of the textile fabric is formed.
Figure 6:
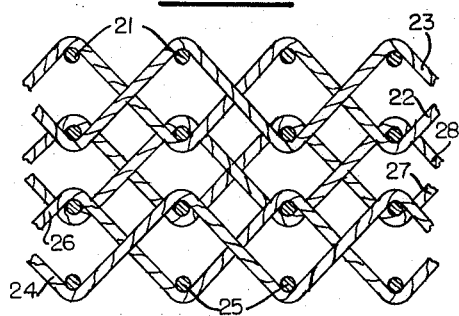
FIG. 6 is a diagrammatic view illustrating the manner by which two layers are bound together to form a solid woven carcass.

The invention pertains to increasing the strength of the belt in the hinge areas 17 and 19 without altering other portions of a conventional belt. These hinge areas which extend throughout the length of the belt and each has a width of not less than two inches and not more than four inches. In the fabrication of a conveyor belt of the "solid woven" type the longitudinally extending strands 21 are loomed with weft thread or filler elements 22 and 23 to form one or an upper layer of the belt carcass. Similar longitudinally extending warp strands 25 are loomed with filler elements or weft threads 24 and 26 to provide another or a lower layer for the belt carcass. These longitudinally extending strands may be bound by various patterns of the filler elements to hold the warp strands in assembled relationship. The two layers as shown in FIG. 5 are bound together into a substantially solid textile carcass by binder threads 27 and 28 as shown in FIG. 6. The binder threads 27 extend up and down through the layers of the longitudinally extending strands 21 and 25 and through the weft threads as best shown in FIG. 6.

In carrying out the present invention the longitudinally extending strands 21 are loomed closely adjacent each other and the warp strands 25 are loomed closely adjacent others in the areas where the belt is subjected to the hinge action and where the belt spans the gap between the idler rolls 11 and 12 and the gap between the idler rolls 11 and 14. The number of longitudinally extending strands 21 and 25 in the hinge area 17 and in the hinge area 19 are greater in number than warp strands throughout other portions of the belt. In one embodiment the number of warp strands amount to about twenty-eight per inch throughout each hinge area 17 and 19 whereas the number of warp strands in other portions of the belt are approximately twenty-four per inch. The hinge areas 17 and 19 may each extend over a transverse width of the belt measuring from two to four inches. The woven structure of the textile strands and threads may be filled with suitable plastic materials or rubber compounds which are heat treated or vulcanized in a conventional manner. The plastic material as indicated at 41 completely encases the textile carcass and provides an impervious covering for the woven structure.

The close spacing of the longitudinally extending strands 21 and 25 in the hinge areas 17 and 19 provides an increase in the number of the textile elements extending longitudinally throughout these two zones of the belt. The belt is consequently stiffened throughout the hinge areas so as to prevent sharp creasing as the belt flexes at the juncture between the ends of the idler rolls. The avoidance of excessive flexing in these longitudinally extending areas reduces the stresses developed in the belt to increase its life.

The increase in the number of longitudinally extending strands in relation to the total is the range of ten to fifteen percent. Less than ten percent increase of the longitudinally extending strands does not appear to provide the desired strength whereas an increase of more than fifteen percent in the number of longitudinal strands tends to stiffen the belt in the hinge areas to an undesired extent and tends to provide too much resistance to flexing of the belt when the trough shape is formed. The increase in the number of longitudinally extending strands by ten percent throughout the entire width of the belt would result in an increase in the cost of the belt by ten percent. By increasing the number of longitudinally extending strands throughout the hinge areas only there is a cost increase of approximately one-sixth of ten percent or a total cost increase of about 1.7 percent.

While the invention has been illustrated and described in connection with particular structural elements in one relationship, it will be appreciated that changes may be made in the components as well as the overall assembly and the teaching may be incorporated in a plied belt. Such modifications and others may be made without departing from the spirit and scope of the invention as set forth in the appended claims.

What is claimed is:

1. A conveyor belt adapted to be flexed in a longitudinally extending hinge area formed by adjacent idler rolls inclined relative each other when the belt is shaped as a trough by troughing idler roll units, said conveyor belt comprising warp strands extending longitudinally within the belt, weft threads maintaining the warp strands in side by side relationship, the number of warp strands in said hinge area being greater and spaced more closely adjacent each other than in other transverse portions of the belt, and plastic material filling the interstices between said warp strands and said weft threads and providing a covering for the warp strands and the weft threads.

2. A conveyor belt according to claim 1 wherein there are more warp strands per inch in the hinge area than in portions laterally of the hinge area.

3. A conveyor belt adapted to be flexed in a longitudinally extending hinge area formed by adjacent idler rolls inclined relative each other when the belt is shaped as a trough by troughing idler roll units, said conveyor belt comprising warp strands extending longitudinally within the belt, filler threads binding the warp strands to provide one layer, longitudinally extending strands within the belt, weft threads binding said longitudinally extending strands to provide a second layer, binder threads securing the layers to each other, the warp strands and the longitudinally extending strands in said hinge area being spaced more closely adjacent each other than in other transverse portions of the belt, and plastic material filling the interstices between said strands and threads and providing a covering for the strands and the threads.

References Cited

UNITED STATES PATENTS

| 2,380,137 | 7/1945 | Williamson | 139—383 |
| 2,862,283 | 12/1958 | Rasero | 161—91 |
| 2,984,594 | 5/1961 | Runton | 74—232 |
| 3,297,513 | 1/1967 | Robinson | 198—193 X |

RICHARD E. AEGERTER, *Primary Examiner.*